United States Patent
Tsue et al.

(10) Patent No.: US 7,675,647 B2
(45) Date of Patent: Mar. 9, 2010

(54) APPARATUS, METHOD, AND PROGRAM FOR EDITING IMAGES

(75) Inventors: Takashi Tsue, Kanagawa-ken (JP); Koichi Yamada, Kanagawa-ken (JP); Akira Yoda, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 1378 days.

(21) Appl. No.: 10/998,142

(22) Filed: Nov. 29, 2004

(65) Prior Publication Data
US 2005/0134946 A1  Jun. 23, 2005

(30) Foreign Application Priority Data

Nov. 27, 2003  (JP) .............................. 2003-396849
Nov. 22, 2004  (JP) .............................. 2004-337600

(51) Int. Cl.
*G06F 15/00* (2006.01)

(52) U.S. Cl. ...................... 358/1.9; 358/1.18; 358/296; 382/165; 348/231.2; 715/204

(58) Field of Classification Search ................ 358/1.18, 358/1.9, 296; 382/224, 305, 209, 274, 165; 715/204; 348/231.2
See application file for complete search history.

(56) References Cited

U.S. PATENT DOCUMENTS 6,453,078 B2 * 9/2002 Bubie et al. ................. 382/305
6,810,149 B1 * 10/2004 Squilla et al. ............... 382/224
7,054,508 B2 * 5/2006 Hanamoto ................... 382/305
7,136,528 B2 * 11/2006 Edwards et al. ............. 382/209
7,148,990 B2 * 12/2006 Atkins et al. ............... 358/1.18

FOREIGN PATENT DOCUMENTS

| JP | 9-214868 A | 8/1997 |
|---|---|---|
| JP | 2003-150969 A | 5/2003 |
| JP | 2003-182260 A | 7/2003 |

* cited by examiner

*Primary Examiner*—King Y Poon
*Assistant Examiner*—Jamares Washington
(74) *Attorney, Agent, or Firm*—Sughrue Mion, PLLC

(57) ABSTRACT

When a photo album on an event such as wedding is generated, images to be inserted in image insertion areas in a template can be selected easily. A professional photographer photographs the bride and groom on the day of wedding, and obtains images. Characteristic quantities of scenes represented by the images are calculated, and the images are classified into image groups of the scenes. With reference to a reference-value sequence table describing reference values of the characteristic quantities of the scenes in the event in order of occurrence of the scenes, the image groups are arranged in order of the scene occurrence. A catalog of the images is generated in the same order, and displayed in an editing screen.

21 Claims, 13 Drawing Sheets

| EVENT NAMES | REFERENCE VALUE SEQUENCE | OT1 |
|---|---|---|
| WEDDING 1 | 1(100,10,10), 2(10,10,100), 3(10,100,10) | |
| WEDDING 2 | 1(20,100,20), 2(10,10,100), 3(30,30,100) | |
| ⋮ | ⋮ | |

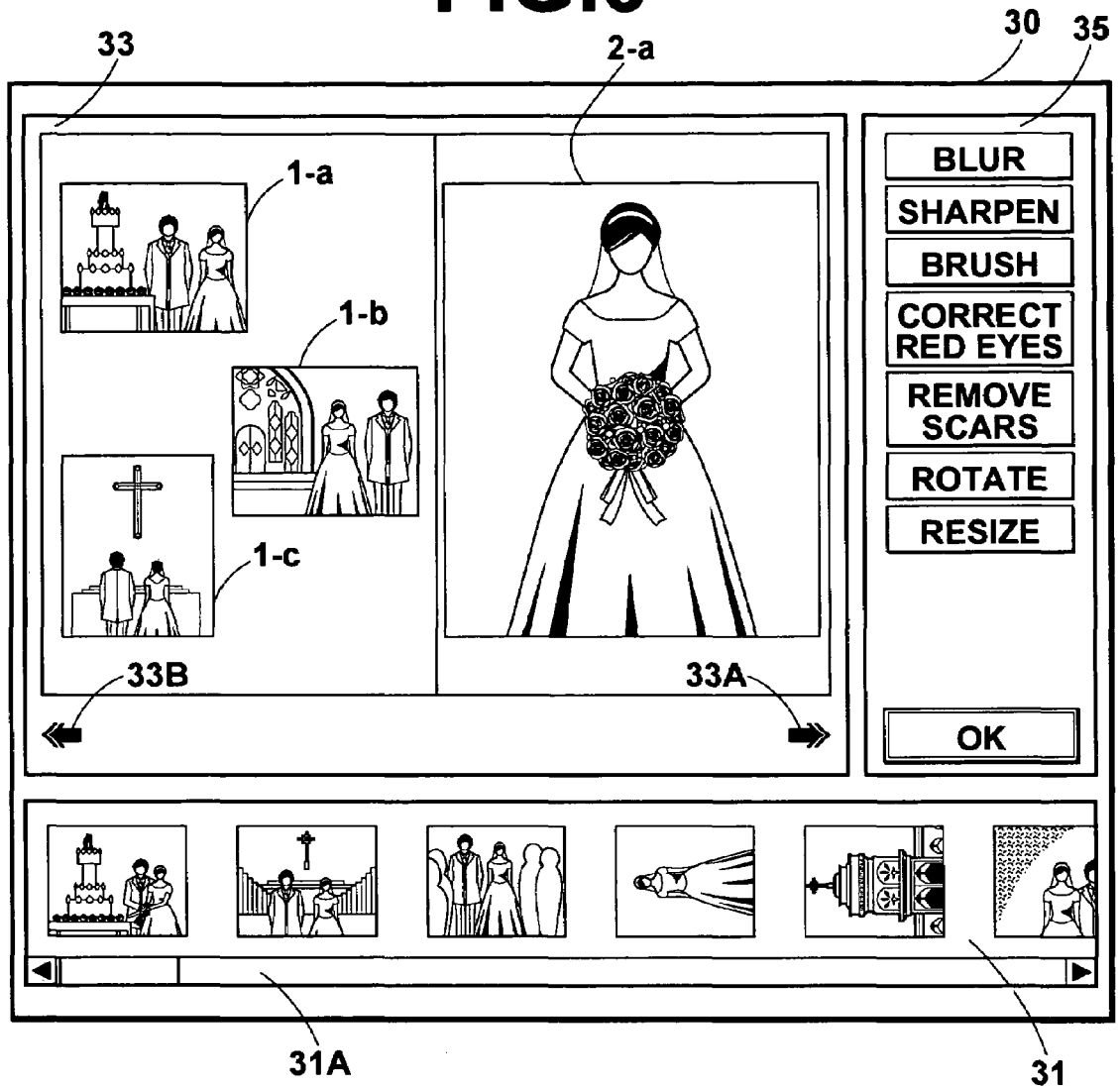

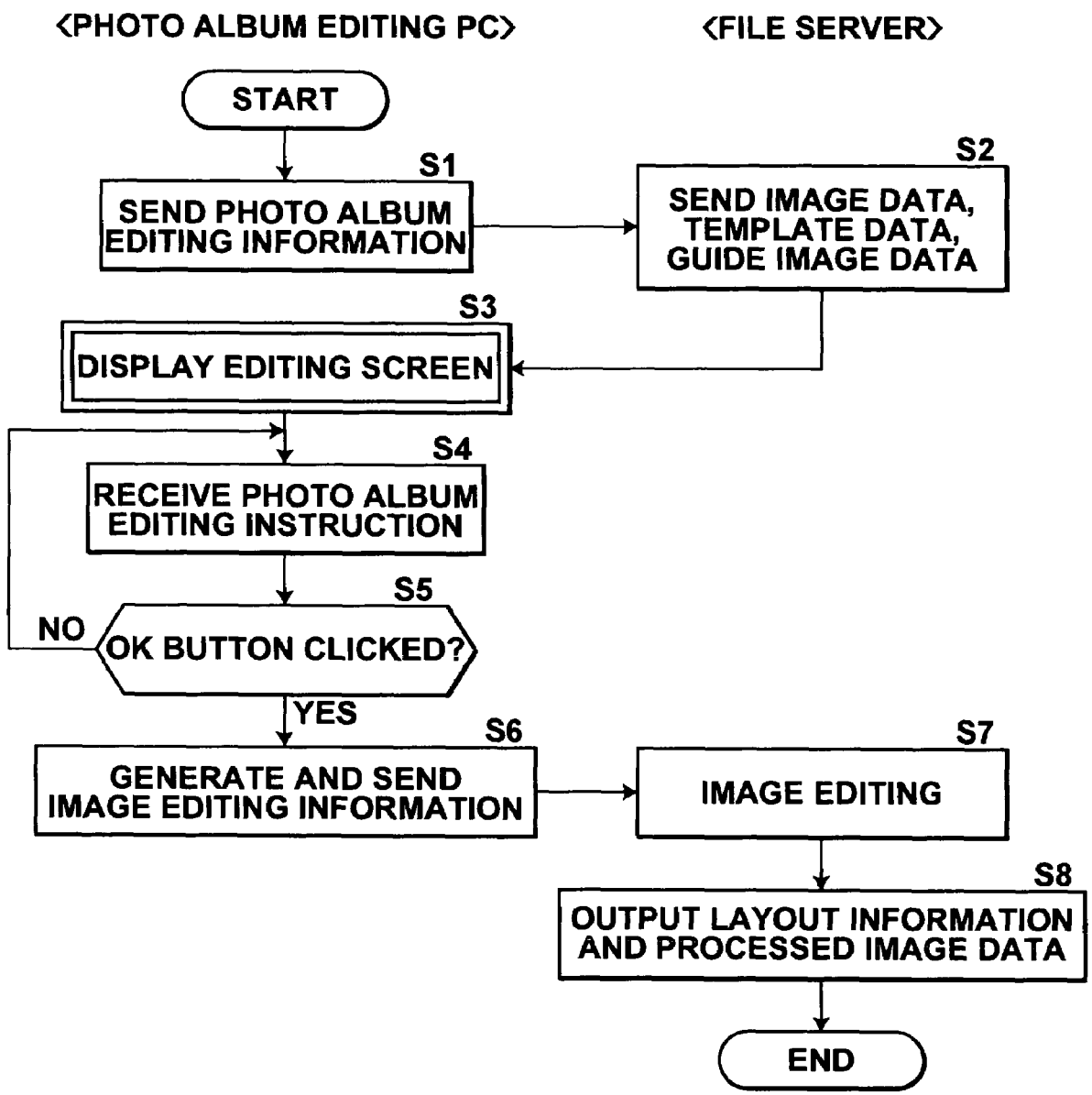

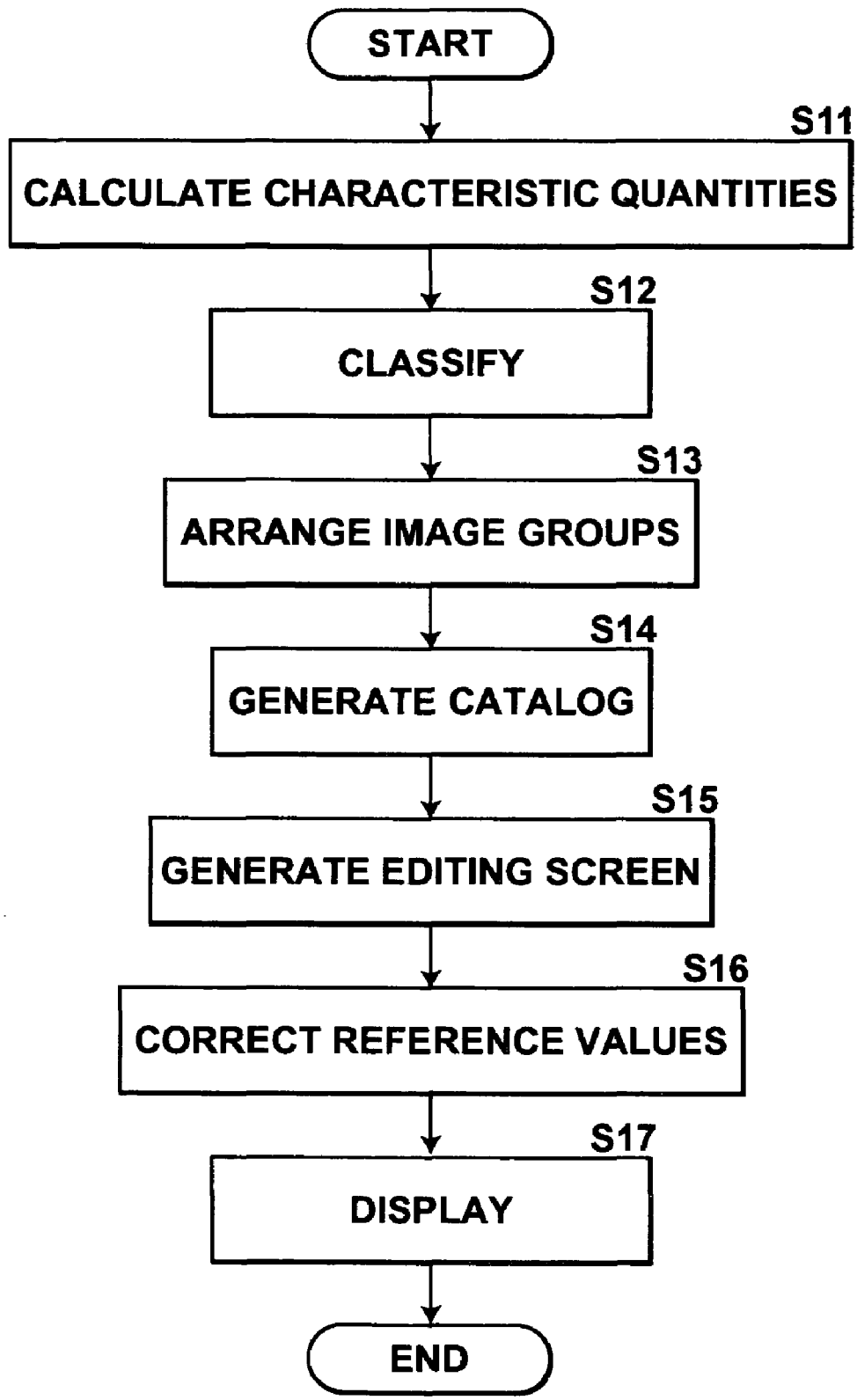

| T1 | | T2 | |
|---|---|---|---|
| 1-a | (100,10,10) | 1-a | (60,60,10) |
| 1-b | (10,10,100) | 1-b | (20,30,40) |
| 1-c | (10,100,10) | 1-c | (10,100,10) |
| — | — | 1-d | (10,10,100) |
| | | | |

| EVENT NAMES | REFERENCE VALUE SEQUENCE | | |
|---|---|---|---|
| | SCENE 1' | SCENE 2' | SCENE 3' |
| WEDDING 1 | 1 | 0 | 1 |
| | 2 | 1 | 0 |
| | 50 | 15 | 0 |
| | 0 | 0 | 35 |
| | 0 | 0 | 15 |
| | 25 | 0 | 5 |
| | 0 | 0 | 5 |
| | 0 | 0 | 5 |
| | 0 | 1 | 1 |
| WEDDING 2 | 0 | 1 | 1 |
| | 0 | 2 | 0 |
| | 0 | 10 | 0 |
| | 0 | 0 | 20 |
| | 0 | 0 | 10 |
| | 0 | 20 | 0 |
| | 0 | 0 | 0 |
| | 0 | 0 | 0 |
| | 0 | 1 | 1 |

| | T2 | OR1 |
|---|---|---|
| DATE | 10/2 | 10/4 |
| 1-a | (58,58,9) | (63,58,10) |
| 1-b | (21,33,41) | (19,27,43) |
| 1-c | (8,90,6) | (13,105,8) |
| 1-d | (8,7,80) | (9,16,110) |

APPARATUS, METHOD, AND PROGRAM FOR EDITING IMAGES

BACKGROUND OF THE INVENTION

1. Field of the Invention

The present invention relates to an image editing apparatus and an image editing method for selecting an image to be inserted in an image insertion area in a template. The present invention also relates to a program for causing a computer to execute the image editing method.

2. Description of the Related Art

As has been described in Japanese Unexamined Patent Publication No. 9(1997)-214868, a method has been proposed for generating a photo album by reading images from a film with a film scanner and by printing an image including a selected part of the images arranged in desired layout.

In addition, another method has also been proposed in Japanese Unexamined Patent Publication No. 2003-182260 for generating a photo album by printing desired images as photographs and by inserting the photographs in photo mounting corners formed on photo album paper according to a size of the photographs and layout of the photo album.

Meanwhile, in order to generate a photo album on a wedding, a professional photographer sometimes photographs the bride and groom as well as attendants in front of a church as a venue for the wedding or in front of a monument during the wedding. Images obtained in this manner are used for generating a photo album, and the photo album tells a story that can be enjoyed later, since the album traces the behavior of the bride and groom on the day.

In order to generate a photo album, a professional photographer or an operator at a DPE store that provides a photo album generation service (hereinafter collectively referred to as an operator) stores images obtained by photography in an image server, and displays on display means such as a monitor of a workstation a catalog of the images stored in the image server and a template having an image insertion area used for photo album generation. The operator then selects one of the images to be inserted in the image insertion area from the catalog. At this time, the operator carries out image editing processing such as processing for changing image quality (blurring or sharpness enhancement, for example), processing for image reshaping (such as rotation, resizing, and trimming), and processing for image restoration (such as red-eye correction and scar removal) on the selected image so that the image inserted in the image insertion area can look attractive.

A photo album is generated by printing images edited in the above manner and pasting the images on photo album paper. A photo album can also be generated by printing composite images having a layout of the photo album generated from edited images inserted in image insertion areas of a template, as has been described in Japanese Unexamined Patent Publication No. 9 (1997)-214868.

In the case where a photo album is generated in the above manner, hundreds of images are obtained by photography on an event such as a wedding. However, an operator is heavily burdened with selection of an image to be inserted in an image insertion area in a template from a catalog including the hundreds of images.

SUMMARY OF THE INVENTION

The present invention has been conceived based on consideration of the above circumstances. An object of the present invention is therefore to enable easy selection of an image to be inserted in an image insertion area in a template for generating a photo album especially on an event such as wedding.

A first image editing apparatus of the present invention comprises:

display means for displaying various kinds of information;

reference-value sequence storage means for storing reference value sequences wherein reference values of a characteristic quantity or characteristic quantities representing a characteristic or characteristics of scenes in predetermined order in each of events are arranged in the predetermined order;

input means for receiving input of information on a predetermined one of the events, images on the predetermined event, and a template as photo album paper having at least one image insertion area in which an image or images are inserted;

characteristic quantity calculation means for calculating the characteristic quantity or quantities in scenes represented by the respective images;

image group generation means for generating image groups by classifying the images into the scenes in the predetermined event with reference to the characteristic quantity or quantities of the scenes calculated for the respective images;

image display control means for arranging the image groups in the order of the scenes in the predetermined event with reference to the reference value sequence corresponding to the predetermined event, for generating a catalog of the images in the order of the arranged image groups, and for displaying the catalog on the display means;

template display control means for displaying the template on the display means together with the catalog; and image selection means for receiving selection of the image or images to be inserted in the image insertion area or areas from the catalog.

Depending on the scenes to be photographed, lightness, saturation, hue, image composition, and a type of subject vary, for example. In other words, for the same scene, lightness, saturation, hue, image composition, and a subject type become almost the same. Therefore, at least one of lightness, saturation, hue, image composition, and a subject type can be used as the characteristic quantity or quantities. More specifically, at least one of a color characteristic of each of the images (such as color balance in the entire image, an average lightness, an average saturation, a color variance representing variance in colors of pixels, a lightness histogram, a saturation histogram, and a hue histogram), a composition characteristic thereof (such as space frequency distribution), and a subject characteristic thereof (such as a proportion of the areas of a face, sky, water region such as the ocean, tree region such as plants and greens, soil and streets or roads, buildings, or the like in the entire image, the size of the face, the number of faces, a subject shape, landscape/portrait (horizontal/vertical) mode of the image, whether a photography place is indoor or outdoor, or the like) can be used as the characteristic quantity or quantities.

The first image editing apparatus of the present invention may further comprise reference-value sequence correction means for correcting the reference values of the characteristic quantity or quantities in the respective scenes in the reference value sequence for the predetermined event, according to the characteristic quantity or quantities of the respective scenes in the images classified into the scenes in the predetermined event.

A second image editing apparatus of the present invention comprises:

display means for displaying various kinds of information;

template reference-value storage means for storing scene reference values as reference values of a characteristic quantity or characteristic quantities representing a characteristic or characteristics of scenes to be inserted in respective image insertion areas in each of templates used as photo album paper having the image insertion areas in which images are inserted;

input means for receiving input of images on a predetermined event having scenes arranged in predetermined order, one of the templates including the image insertion areas in which the images corresponding to the scenes in the predetermined event are respectively inserted, and information on the template;

characteristic quantity calculation means for calculating the characteristic quantity or quantities of the scenes represented by the respective images;

image group generation means for generating image groups by classifying the images into the scenes in the predetermined event, with reference to the characteristic quantity or quantities of the scenes calculated for the respective images;

template display control means for displaying the template on the display means;

specification reception means for receiving specification of any one of the image insertion areas in the template displayed on the display means;

image display control means for selecting the image group classified into the scene of the specified image insertion area with reference to the scene reference value or values of the specified image insertion area in the template, for generating a catalog of the images classified into the image group, and for displaying the catalog on the display means; and image selection means for receiving selection of the image to be inserted in the specified image insertion area from the catalog.

The second image editing apparatus of the present invention may further comprise scene reference-value correction means for correcting the scene reference values for the respective image insertion areas in the template, according to the characteristic quantity or quantities of the respective scenes in the images classified into the scenes in the predetermined event.

Furthermore, each of the first image editing apparatus and the second image editing apparatus of the present invention may comprise guide image display means for displaying in the image insertion area or areas in the template displayed on the display means a guide image or guide images for guiding the image or images to be inserted therein.

In addition, each of the first image editing apparatus and the second image editing apparatus of the present invention may also comprise editing means for editing the image or images inserted in the image insertion area or areas.

In the first image editing apparatus and the second image editing apparatus of the present invention, the editing means carries out at least one of processing for changing a quality of the image or images, processing for reshaping the image or images, and processing for restoring the image or images on the image or images.

A first image editing method of the present invention comprises the steps of:

receiving input of information representing a predetermined one of events, images on the predetermined event, and a template to be used as photo album paper having at least one image insertion area in which an image or images are inserted;

calculating a characteristic quantity or characteristic quantities of scenes represented by the respective images;

generating image groups by classifying the images into the scenes in the predetermined event with reference to the characteristic quantity or quantities of the scenes calculated for the respective images;

arranging the image groups in order of the scenes in the predetermined event with reference to one of reference value sequences corresponding to the predetermined event, generating a catalog of the images in the order of the arranged image groups, and displaying the catalog on the display means;

displaying the template on the display means together with the catalog; and receiving selection of the image or images to be inserted in the image insertion area or areas from the catalog. The reference value sequences are stored in reference-value sequence storage means. In the reference value sequences, reference values of the characteristic quantity or quantities representing scenes arranged in predetermined order in each of the events are described in the predetermined order.

A second image editing method of the present invention comprises the steps of:

receiving input of images on a predetermined event having scenes arranged in predetermined order, one of templates including image insertion areas in which images corresponding to the scenes in the predetermined event are inserted, and information on the template;

calculating a characteristic quantity or characteristic quantities in the scenes represented by the respective images;

generating image groups by classifying the images into the scenes in the predetermined event, with reference to the characteristic quantity or quantities of the scenes calculated for the respective images;

displaying the template on display means;

receiving specification of any one of the image insertion areas in the template displayed on the display means;

selecting the image group classified into the scene of the specified image insertion area with reference to a scene reference value or scene reference values corresponding to the specified image insertion area in the template, generating a catalog of the images in the selected image group, and displaying the catalog on the display means; and receiving selection of the image to be inserted in the specified image insertion area from the catalog. The scene reference values are stored in template reference-value storage means. The scene reference values describe reference values of the characteristic quantity or quantities representing a characteristic or characteristics of scenes to be inserted in respective image insertion areas in each of the templates as photo album paper having the image insertion areas in which images are inserted.

The first image editing method and the second image editing method of the present invention may be provided as programs for causing a computer to execute the image editing methods.

According to the first image editing apparatus and the first image editing method of the present invention, when the information representing the predetermined event, the images on the predetermined event, and the template as the photo album paper having at least one image insertion area are received, the characteristic quantity or quantities of the scenes represented by the respective images are calculated. Based on the characteristic quantity or quantities of the scenes calculated for the respective images, the images are classified into the scenes in the predetermined event, generating the image groups. With reference to the reference value sequence corresponding to the predetermined event, the image groups are arranged in order of the scenes in the predetermined event, and the catalog of the images is generated in order of the arranged image groups. The catalog is displayed on the display means together with the template. In this manner, the images in each of the scenes are displayed collectively in the catalog in order of the scenes in the predetermined event. Therefore, an operator who carries out an editing operation can easily select the images in the respective scenes with reference to the catalog. Consequently, a burden on the operator can be reduced at the time of selection of the images for insertion in the image insertion areas in the template.

Furthermore, by correcting the reference values of the characteristic quantity or quantities in the respective scenes in the reference value sequence for the predetermined event by using the characteristic quantity or quantities of the scenes of the classified images in the predetermined event, the reference values of the characteristic quantity or quantities in the scenes in the reference value sequence can become closer to the characteristic quantity or quantities of the scenes represented by the images used for actual editing. Therefore, the image groups can be arranged more appropriately according to the reference value sequence of the scenes.

According to the second image editing apparatus and the second image editing method of the present invention, upon reception of the images on the predetermined event including the scenes arranged in the predetermined order, the template having the image insertion areas in which the images corresponding to the scenes in the predetermined event are inserted, and the information on the template, the characteristic quantity or quantities of the scenes represented by the respective images are calculated. According to the characteristic quantity or quantities calculated on the respective images, the images are classified into the scenes in the predetermined event for generating the image groups, and the template is displayed on the display means. When an operator specifies one of the image insertion areas in the template, the scene reference value or values of the specified image insertion area of the template are referred to, and the image group classified into the scene of the specified image insertion area is selected. The catalog of the images classified into the selected image group is generated and displayed on the display means. In this manner, when the operator only specifies any one of the image insertion areas in the template, the catalog of only the images of the scene to be inserted in the image insertion area is displayed. Therefore, the operator carrying out an editing operation can easily select the images for the respective scenes with reference to the catalog. Consequently, a burden on the operator is reduced at the time of selection of the images for insertion in the image insertion areas in the template.

Furthermore, by correcting the scene reference values for the respective image insertion areas in the template according to the characteristic quantity or quantities of the scenes of the images classified into the scenes in the predetermined event, the scene reference values can become closer to the characteristic quantity or quantities of the scenes represented by the images used for actual editing. Therefore, the image groups for insertion in the image insertion areas can be selected more appropriately according to the reference values of the characteristic quantity or quantities for the scenes.

BRIEF DESCRIPTION OF THE DRAWINGS

FIG. 6 shows an example of an editing screen;

FIG. 7 shows an example of layout information;

FIG. 8 is a flow chart showing a procedure carried out in the first embodiment;

FIG. 9 is a flow chart showing a procedure carried out at the time of display of the editing screen in the first embodiment;

FIG. 10 shows an example of a template reference-value table; and

FIG. 13 is a diagram illustrating an example of a target value sequence table in the third embodiment.

FIG. 16 is a diagram illustrating target value history information.

DESCRIPTION OF THE PREFERRED EMBODIMENTS

Figure 1:
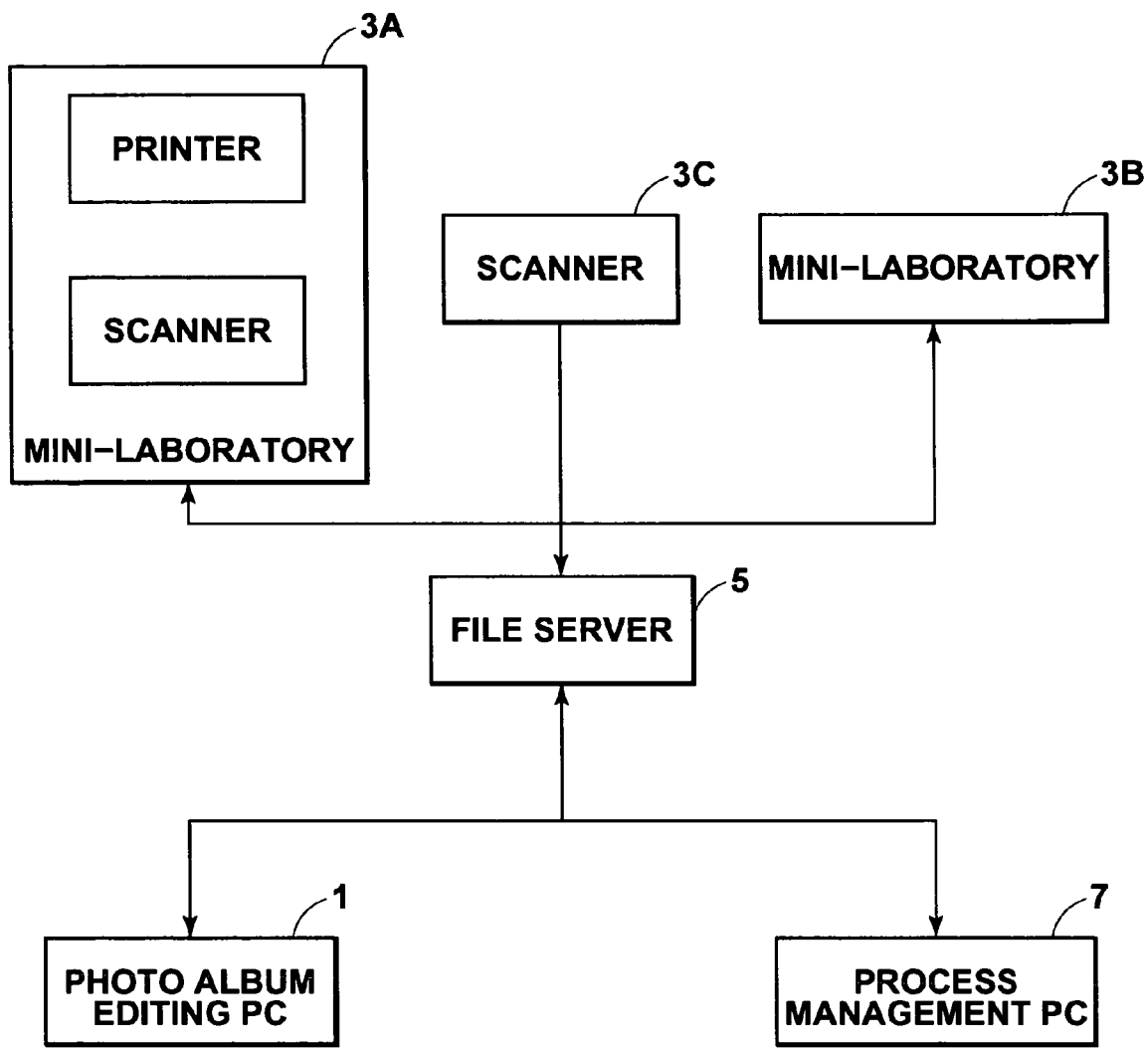
FIG. 1 is a block diagram showing a configuration of an image editing system having an image editing apparatus of a first embodiment of the present invention.

Hereinafter, embodiments of the present invention will be explained with reference to the accompanying drawings. FIG. 1 is a block diagram showing a configuration of an image editing system comprising an image editing apparatus of a first embodiment of the present invention. As shown in FIG. 1, the image editing system in the first embodiment comprises a photo album editing personal computer (hereinafter referred to as the photo album editing PC) 1, a plurality (2, in this case) of mini-laboratories 3A and 3B, a film scanner (hereinafter referred to as a scanner) 3C, a file server 5, and a process management PC 7 connected to each other via a network. The photo album editing PC 1 has functions of the image editing apparatus in the first embodiment of the present invention. Each of the mini-laboratories 3A and 3B has a scanner for obtaining image data sets representing images recorded on a developed film by reading the images from the film, and a printer for printing the image data sets. The file server 5 has a large-capacity hard disc for storing the image data sets. The process management PC 7 manages processes of photo album generation.

In this embodiment, the case of a wedding as an event will be explained. In the wedding, a professional photographer photographs the bride and groom who requested generation of a photo album (hereinafter referred to as a user) on the day of wedding, and the photographer generates a photo album telling a story of the event by using the images. However, the event is not necessarily limited to wedding.

Figure 2:
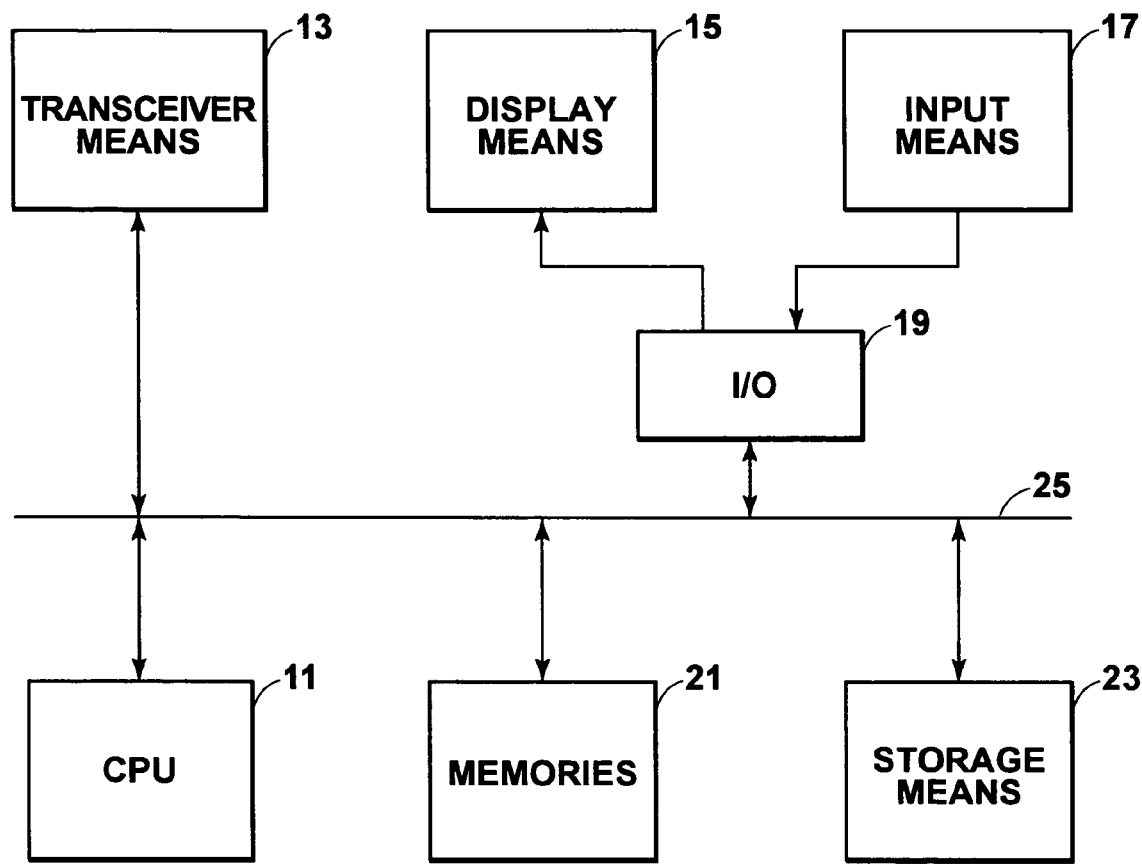
FIG. 2 is a block diagram showing a configuration of a photo album editing PC.

FIG. 2 is a block diagram showing a configuration of the photo album editing PC 1. As shown in FIG. 2, the photo album editing PC 1 comprises a CPU 11 (acting as the characteristic quantity calculation means, the image group generation means, the image display control means, the template display control means, the reference-value sequence correction means, and the scene reference-value correction means), transceiver means 13 (acting as the input means) for networking, display means 15, an I/O 19, memories 21, and storage means 23 (acting as the reference-value sequence storage means and the template reference-value storage means). The CPU 11 controls the photo album editing PC 1. The transceiver means 13 sends and receives various kinds of information including the image data sets to and from the file server 5. The display means 15 displays various kinds of information such as the images and a template. The I/O 19 reads various kinds of information input by an operator of the photo album editing PC 1 via input means 17 (acting as the image selection means and the specification reception means) for delivering the information to the CPU 11. The I/O 19 also outputs a display instruction to the display means 15 according to an instruction from the CPU 11. The memories 21 comprise a ROM storing a program for operating the CPU 11 and various constants, and a RAM used by the CPU 11 as a workspace. The storage means 23 comprises a hard disc for storing various kinds of information such as the image data sets.

A bus 25 connects the CPU 11 in the photo album editing PC 1 to peripheral circuits including the transceiver means 13, the I/O 19, the memories 21, and the storage means 23. In this manner, the CPU 11 can control the peripheral circuits. More specifically, the CPU 11 controls the transceiver means 13, the display means 15, the memories 21, and the storage means 23 for reception of information such as the image data sets and template data sets that will be explained later from the file server 5, for storing the image data sets in the storage means 23, and for displaying a catalog and the template on the display means 15 in order to select a part of the images for insertion in an image insertion area or image insertion areas (hereinafter referred to as the image insertion areas) of the template, to generate image editing information, and to transmit the image editing information to the file server 5 in response to an instruction input from the input means 17 by the operator.

The photo album editing PC 1 receives photo album editing information comprising a user ID and information on the template specified by the user who requested generation of the photo album when the operator carries out a photo album editing operation. The photo album editing PC 1 also receives information on the event on which the user has requested generation of the photo album. The photo album editing PC 1 sends the photo album editing information to the file server 5, and receives one of the template data sets, the image data sets, and guide image data sets to be inserted in the image insertion areas in the template from the file server 5. The photo album editing PC 1 then reduces the image data sets for generating the catalog of the images represented by the image data sets, and inserts guide images represented by the guide image data sets in the image insertion areas of the template represented by the template data set. In this manner, the photo album editing PC 1 displays an editing screen including the catalog and the template having the guide images inserted therein on the display means 15. Hereinafter, how the editing screen is displayed is explained.

When the photo album editing PC 1 receives the image data sets, the photo album editing PC 1 calculates a characteristic quantity or characteristic quantities (hereinafter referred to as the characteristic quantities) of scenes of the images represented by the image data sets. In this embodiment, the characteristic quantities refer to averages of R, G, and B colors in the images represented by the image data sets. In other words, values of R, G, and B are respectively added for all pixels in each of the images for obtaining totals and the totals are divided by the number of the pixels for obtaining the characteristic quantities.

The photo album editing PC 1 then generates image groups by classifying the image data sets into the scenes according to the characteristic quantities calculated in the above manner. More specifically, distances between the characteristic quantities of all the image data sets are calculated in a three-dimensional space (r,g,b), and the image data sets having the distances equal to or smaller than a predetermined threshold value Th1 are grouped together as one of the image groups. In the same image group, the image data sets represent the same scene represented by the characteristic quantities that are similar to each other.

Figure 3:
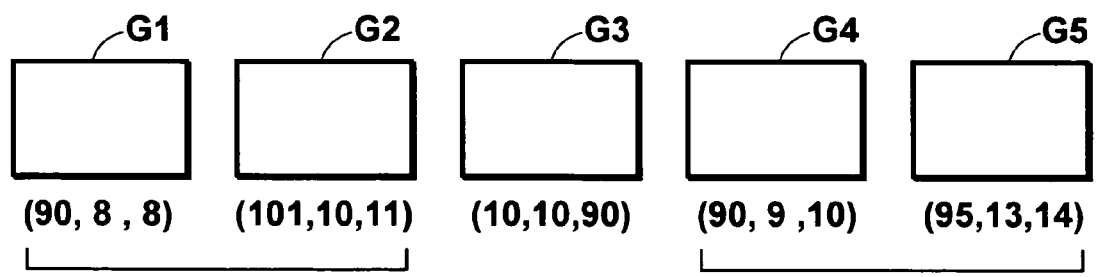
FIG. 3 is a diagram for explaining classification of image data sets.

In this embodiment, the characteristic quantities are calculated in order of file names of the image data sets. At this time, as shown in FIG. 3, in the case where image data sets G1 and G2 are classified into an image group A while an image data set G3 is classified into an image group B, if the image data sets G4 and G5 are also classified into the group A, the image data set G3 may be classified into the image group A in consideration of scene continuity at the time of photography.

The storage means 23 stores a reference-value sequence table describing reference values of the characteristic quantities representing scenes arranged in predetermined order in respective events. In this embodiment, the predetermined order refers to order of occurrence of the scenes in the events. However, the predetermined order does not necessarily limited thereto.

Figures 4, 5:
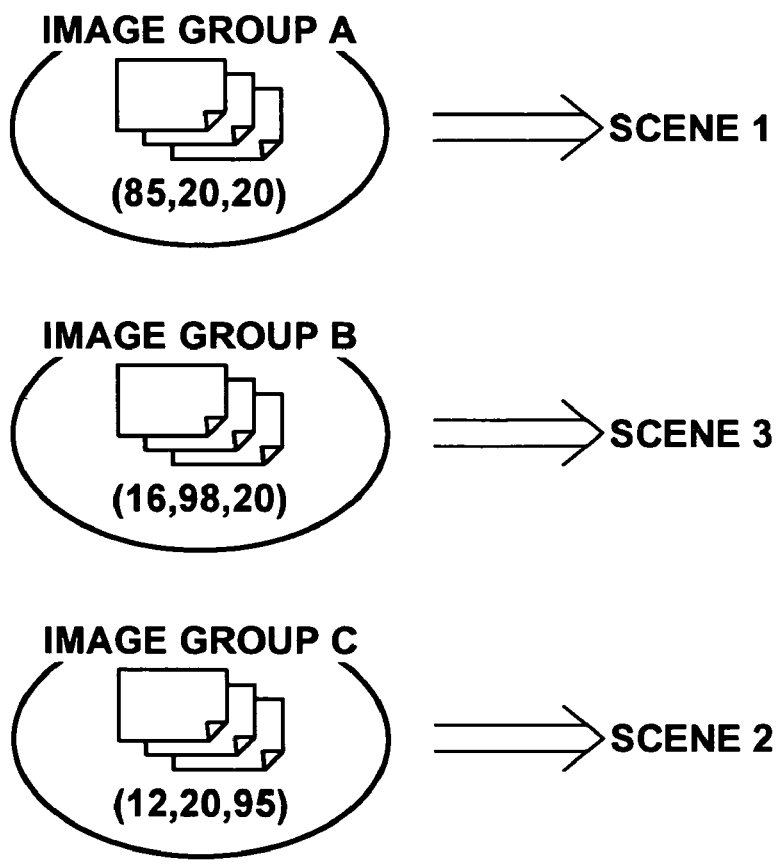
FIG. 4 shows an example of a reference-value sequence table.
FIG. 5 explains correspondence between image groups and scenes.

FIG. 4 shows an example of the reference-value sequence table. As shown in FIG. 4, a reference-value sequence table OT1 describes the reference values of the characteristic quantities in each of the scenes in each of the events represented by event names such as Wedding 1 and Wedding 2, in order of occurrence of the scenes. For example, in the event Wedding 1, three scenes 1, 2, and 3 occur in this order, and the reference values of the characteristic quantities of the scenes 1, 2, and 3 are (100,10,10), (10,10,100), and (10,100,10), respectively. The reference values of the characteristic quantities can be found by calculating the averages of R, G, and B colors in images obtained by photography of each of the scenes.

The photo album editing PC 1 arranges the image groups in the predetermined order, with reference to the reference-value sequence table OT1. FIG. 5 shows correspondence between the image groups and the scenes. In this embodiment, assume that the image data sets have been classified into the image groups A, B, and C, and Wedding 1 has been specified as the event.

The photo album editing PC 1 firstly calculates the averages of the characteristic quantities in the scenes for all the image data sets in the respective image groups A, B, and C. As shown in FIG. 5, the averages for the image group A are (85,20,20) while the averages for the image group B are (16,98,20). The averages for the image group C are (12,20, 95). The photo album editing PC 1 calculates the distances in the three-dimensional space (r,g,b) between the averages of the characteristic quantities in each of the image groups A, B, and C and the reference values of the characteristic quantities of the scenes in Wedding 1 in the reference-value sequence table OT1. The photo album editing PC 1 relates the respective image groups to the scenes whose distances to the respective image groups are minimal. In this manner, the image group A is related to the scene 1, while the image groups B and C are related to the scenes 3 and 2, respectively.

The photo album editing PC 1 then arranges the image groups A, B, and C in order of occurrence of the scenes in the event. In Wedding 1, the scenes occur in order of 1, 2, and 3. Therefore, the image groups are arranged in order of A, C, B.

The photo album editing PC 1 generates the catalog of the image data sets in the order described above, and displays the catalog in the editing screen.

After respectively relating the image groups A, C, and B to the scenes 1, 2, and 3, the photo album editing PC 1 changes the reference values of the scenes in the reference-value sequence table OT1 by using the averages of the characteristic quantities of the scenes for the image groups A, B, and C. In other words, the reference values for the scene 1 are changed to (93,15,15) by averaging the reference values (100,10,10) and the averages (85,20,20) of the image group A. Likewise, the reference values for the scene 2 are changed to (11,15,93) by averaging the reference values (10,10,100) and the averages (12,20,95) of the image group C. The reference values for the scene 3 are changed to (13,99,15) by averaging the reference values (10,100,10) and the averages (16,98,20) of the image group B.

FIG. 6 shows an example of the editing screen. As shown in FIG. 6, an editing screen 30 includes a catalog display field 31 in which the catalog is displayed, a template display field 33 in which the template having the guide images inserted therein is displayed, and a tool box 35.

A scroll bar 31A is displayed in the catalog display field 31, and the images that cannot be displayed in one screen can be displayed by moving the scroll bar 31A to the right or left. The images are displayed from the left in the catalog display field 31 in order of the image groups A, C, and B.

In the example shown in FIG. 6, the template in the template display field 33 has 4 image insertion areas 1-*a*, 1-*b*, 1-*c*, and 2-*a*, all of which are filled with the guide images.

The guide images notify the operator who carries out the photo album editing operation of what composition the respective images should have in the corresponding image insertion areas in the template. In the case of photography for generating photo albums on events, the photography is carried out at the same place and in the same situation regardless of who a user as a requester is. For example, in the case of photography of brides and grooms in weddings, photography is carried out at a predetermined place in a hotel and in a predetermined situation such as exchange of marriage rings and cutting a wedding cake.

Therefore, by using the same composition for the images to be inserted in the image insertion areas in the template for all users who selected the same template, a quality of photo albums generated in the above manner can be constant. Consequently, the guide images can be illustrations representing the composition to be inserted in the image insertion areas, drawings, or sample images obtained by photography of a model in the same place or in the same situation, for example. In this embodiment, sample images generated by photographing a model are inserted in the image insertion areas 1-*a*, 1-*b*, 1-*c*, and 2-*a*.

In the template display field 33 are displayed arrow buttons 33A and 33B for changing a page of the template being displayed in the template display field 33 in the case where the template has a plurality of pages. The operator can change the page of the template to be displayed in the editing screen 30 by clicking the arrow button 33A or 33B.

In the tool box 35 are displayed buttons for carrying out image quality changing processing such as blurring, sharpening, and brushing, buttons for carrying out image restoration processing such as red-eye correction and scar removal, and buttons for carrying out image reshaping processing such as rotation and resizing, as well as an OK button for ending the processing.

The operator carries out the photo album editing operation by inputting photo album editing instructions while using the editing screen 30. More specifically, the operator selects one of the images having the same composition as the guide image inserted in one of the image insertion areas from the catalog, and drags and drops the selected image by using the input means 17. In this manner, the operator inserts the selected image in the corresponding image insertion area. After the insertion, the operator can select the image insertion area for editing the selected image inserted therein by clicking any one of the buttons in the tool box 35. For example, by clicking the button for rotation, the operator can rotate the image by 90 degrees in the clockwise direction. By clicking the button for resizing, the operator can change a size of the image. Furthermore, by clicking the button for blurring or sharpening or brushing, a quality of the image can be changed. By clicking the button for red-eye correction or scar removal, the image can be restored.

After selecting all the images to be inserted in the respective image insertion areas and editing all the selected images, the operator clicks the OK button for ending the photo album editing operation using the template. In response to clicking the OK button, the photo album editing PC 1 generates the image editing information including the file names of the selected images, information relating the file names of the images to be inserted in the respective image insertion areas and the corresponding image insertion areas, information on the processing to be carried out on the image data sets such as blurring, reduction or enlargement, and red-eye correction, information on an area to be trimmed in the case of trimming, and information on a magnification ratio in the case of reduction or enlargement. The image editing information is sent to the file server 5.

The file server 5 stores the image data sets obtained by reading the images recorded on the developed film by using the scanner 3C or the mini-laboratory 3A or 3B. The image data sets are recorded in a folder for the user who requested generation of the photo album. The file server 5 also stores the template data sets representing templates to be used for photo album generation, as well as the guide image data sets to be inserted in the image insertion areas in the templates.

The file server 5 refers to the photo album editing information sent from the photo album editing PC 1, and sends the template data set representing the template selected by the user, the image data sets stored in the folder corresponding to the user ID, and the guide image data sets representing the guide images to be inserted in the image insertion areas in the selected template to the photo album editing PC 1.

When the image editing information is received from the photo album editing PC 1, the file server 5 refers to the file names of the image data sets representing the selected images included in the image editing information, and carries out preparatory processing and editing processing on the selected image data sets for generating processed image data sets. The preparatory processing includes at least one of brightness correction processing, color correction processing and gradation correction processing on the selected image data sets. The editing processing includes the processing specified by the image editing information. More specifically, the editing processing includes the processing for changing image quality such as blurring, sharpening, and brushing, the image reshaping processing such as trimming and enlargement/reduction processing, and the image restoration processing such as red-eye correction and scar removal on the image data sets specified by the image editing information.

The file server 5 generates layout information from the information relating the file names of the image data sets and the image insertion areas of the template included in the image editing information. FIG. 7 shows an example of the layout information. As shown in FIG. 7, the layout information relates the names of the image data sets (DSCF0012.jpg, DSCF0020.jpg, DSCF0023.jpg, and DSCF0030.jpg) and the corresponding image insertion areas 1-a, 1-b, 1-c, and 2-a in the template T1. The file server 5 sends the processed image data sets and the layout information to either the mini-laboratory 3A or 3B.

The process management PC 7 receives information representing completion of the processes such as the photo album editing operation, printing, and photo album inspection input by the operator, in order to manage the processes regarding photo album generation. In the case where the photo album has passed the inspection carried out by the operator for examining the quality of the generated photo album, the process management PC receives information thereon, and finishes the process management for the photo album. In the case where the photo album did not pass the inspection, the process management PC 7 receives an instruction for generating the photo album again.

A procedure carried out in this embodiment will be explained next. FIG. 8 is a flow chart showing the procedure. The file server 5 has already stored the image data sets obtained by reading the images from the developed film recorded with photographs on the wedding of the user. The photo album editing information comprising the user ID and the information on the template selected by the user has already been input. The event on which the user requested photo album generation has also been input.

When the operator inputs an instruction for editing the photo album from the photo album editing PC 1, the procedure starts. The photo album editing PC 1 sends the photo album editing information including the user ID and the information on the template selected by the user to the file server 5 (Step S1).

The file server 5 receives the photo album editing information, and sends the image data sets stored in the folder corresponding to the user ID, the template data set representing the template selected by the user, and the guide image data sets representing the guide images to be inserted in the image insertion areas in the template to the photo album editing PC 1 (Step S2).

The photo album editing PC 1 receives the image data sets, the template data set, and the guide image data sets, and displays the editing screen 30 on the display means 15 (Step S3).

FIG. 9 is a flow chart showing a procedure for displaying the editing screen 30. The photo album editing PC 1 calculates the characteristic quantities for the scenes of the image data sets (Step S11). The photo album editing PC 1 generates the image groups by classifying the image data sets into the scenes of the image groups according to the characteristic quantities (Step S12). The photo album editing PC 1 arranges the image groups in order of occurrence of the scenes in the event Wedding 1 with reference to the reference-value sequence table OT1 (Step S13), and generates the catalog of the images represented by the image data sets in the arranged order (Step S14). The photo album editing PC 1 generates the editing screen 30 including the catalog in the catalog display field 31 and the template in the template display field 33 (Step S15).

The photo album editing PC 1 corrects the reference values of the characteristic quantities of the scenes in the reference value sequence for Wedding 1 in the reference-value sequence table OT1, by using the averages of the characteristic quantities for the scenes of the respective image groups (Step S16). The photo album editing PC 1 displays the editing screen 30 (Step S17) to end the procedure. Step S16 may be carried out after Step S13 or later, or in parallel to Step S13 or later.

The guide images represented by the guide image data sets are inserted in the image insertion areas in the template displayed in the template display field 33 in the editing screen 30.

The photo album editing PC 1 receives the photo album editing instructions input by the operator viewing the editing screen 30 (Step S4 in FIG. 8). The photo album editing PC 1 then judges whether or not the OK button has been clicked (Step S5). If a result at Step S5 is affirmative, the photo album editing PC 1 generates the image editing information, and sends the image editing information to the file server 5 (Step S6). If the result at Step S5 is negative, the procedure returns to Step S4 for continuously receiving the editing instructions from the operator.

The file server 5 receives the image editing information, and carries out the editing processing by referring to the file names of the selected image data sets included in the image editing information (Step S7). The file server 5 sends the processed image data sets generated through the editing processing and the layout information generated from the image editing information to either the mini-laboratory 3A or 3B (Step S8) to end the procedure.

The mini-laboratory 3A or 3B receives the processed image data sets and the layout information, and prints the processed image data sets for generating prints thereof. The operator (or an operator dedicated to photo album binding) pastes the prints in print insertion areas in photo album paper corresponding to the template while referring to the layout information, and carries out binding and the like for generating the photo album.

The operator in charge of quality control inspects the photo album generated in this manner. In the case where the photo album has passed the inspection, the photo album is sent to the user. In the case where the photo album did not pass the inspection, the instruction is input from the process management PC 7 for generating the photo album again.

As has been described above, in the first embodiment, the image data sets obtained by photography are classified into the image groups of the scenes in the event, according to the characteristic quantities of the scenes. With reference to the reference-value sequence table OT1, the catalog of the images is generated in order of the scenes in the event. Therefore, the images for each of the scenes are displayed collectively in the catalog display field 31 in the editing screen 30, and the operator carrying out the editing operation can easily select the images for the respective scenes by referring to the catalog. In this manner, a burden on the operator can be reduced at the time of selection of the images to be inserted in the image insertion areas in the template.

Furthermore, by correcting the reference values of the characteristic quantities for the scenes included in the reference-value sequence table OT1 by using the averages of the characteristic quantities of the scenes obtained from the image data sets classified into the image groups corresponding to the respective scenes, the reference values of the characteristic quantities of the scenes in the reference-value sequence table OT1 can be corrected to be closer to the characteristic quantities of the scenes represented by the images actually used for editing. Therefore, the image groups can be arranged more appropriately according to the reference values of the characteristic quantities of the scenes.

A second embodiment of the present invention will be explained next. In the first embodiment, the catalog of the images is generated by arranging the image groups in order of the scenes in the event with reference to the reference-value sequence table OT1. However, in the second embodiment, the catalog of the images is generated by using the image groups comprising the images having the characteristic quantities corresponding to the respective scenes in the image insertion areas in one of templates corresponding to an event (hereinafter referred to as the event template), with reference to scene reference values as the reference values of the characteristic quantities of the scenes to be inserted in the respective image insertion areas in the event template, instead of the reference-value sequence table OT1.

For this reason, in the second embodiment, the storage means 23 stores a template reference-value table describing the scene reference values as the reference values of the characteristic quantities of the scenes to be inserted in the image insertion areas in the respective templates.

FIG. 10 shows an example of the template reference-value table. As shown in FIG. 10, a template reference-value table TT1 describes the scene reference values for the image insertion areas such as 1-a, 1-b, and 1-c in each of the templates such as T1 and T2. For example, the template T1 has three image insertion areas 1-a, 1-b, and 1-c, and the scene reference values therefore are (100,10,10), (10,10,100), and (10, 100,10), respectively. The reference values of the characteristic quantities for the scenes are found by averaging R, G, and B colors in images obtained by photography of the scenes.

In the second embodiment, assume that the template T1 has been specified as the event template, and the image data sets have been classified into the image groups A, B, and C whose average characteristic quantities are shown in FIG. 5.

The photo album editing PC 1 classifies the image data sets into the image groups of the scenes, and displays the editing screen 30. At this time, the catalog display field 31 is blank in an initial state thereof. The template T1 as the event template is displayed in the template display field 33. When an operator specifies a desired one of the image insertion areas in the template T1 displayed in the template display field 33, the photo album editing PC 1 calculates the distances between the scene reference values for the specified image insertion area and the averages of the characteristic quantities of the scenes for the image groups A, B, and C in the three-dimensional space of the characteristic quantities (r,g,b), with reference to the scene reference values of the specified image insertion area in the template reference-value table TT1, and selects the image group having the shortest distance.

Assume that the image insertion area 1-a has been specified. As shown in FIG. 5, the averages of the image group A are (85,20,10) and the averages for the image group B are (16,98,20). The averages for the image group C are (12,20, 95). Therefore, the image group having the shortest distance from the reference values for the image insertion area 1-a is the image group A. Therefore, the photo album editing PC 1 generates the catalog of the image data sets classified into the image group A when the image insertion area 1-a is specified, and displays the catalog in the catalog display field 31 in the editing screen 30.

Meanwhile, if another one of the image insertion areas is specified, the photo album editing PC 1 calculates the distances in the three-dimensional space (r,g,b) between the averages of the characteristic quantities of the scenes for the image groups A, B, and C and the scene reference values of the specified image insertion area with reference to the scene reference values in the template reference-value table TT1 in the same manner as has been described above, and finds the image group having the shortest distance for generating the catalog of the image data sets in the image group. For example, if the image insertion area 1-b is specified, the catalog of the image data sets in the image group C is generated. The catalog of the image data sets in the image group B is generated if the image insertion area 1-c is specified.

After selecting the image group, the photo album editing PC 1 corrects the scene reference values of the image insertion area in the template reference-value table TT1 by using the averages of the characteristic quantities of the scenes in the selected image group. More specifically, the scene reference values for the image insertion area 1-a are changed to (93, 15, 15) by averaging the scene reference values (100, 10, 10) and the averages (85, 20, 20) for the image group A. Likewise, in the case where the image insertion area 1-b has been specified and the image group C has been selected therefor, the scene reference values for the image insertion area 1-b are changed to (11, 15, 93) by averaging the reference values (10, 10, 100) and the averages (12, 20, 95) for the image group C. In the case were the image insertion area 1-c has been specified and the image group B has been selected therefor, the scene reference values for the image insertion area 1-c are changed to (13, 99, 15) by averaging the scene reference values (10, 100, 10) and the averages (16, 98, 20) for the image group B.

Figure 11:
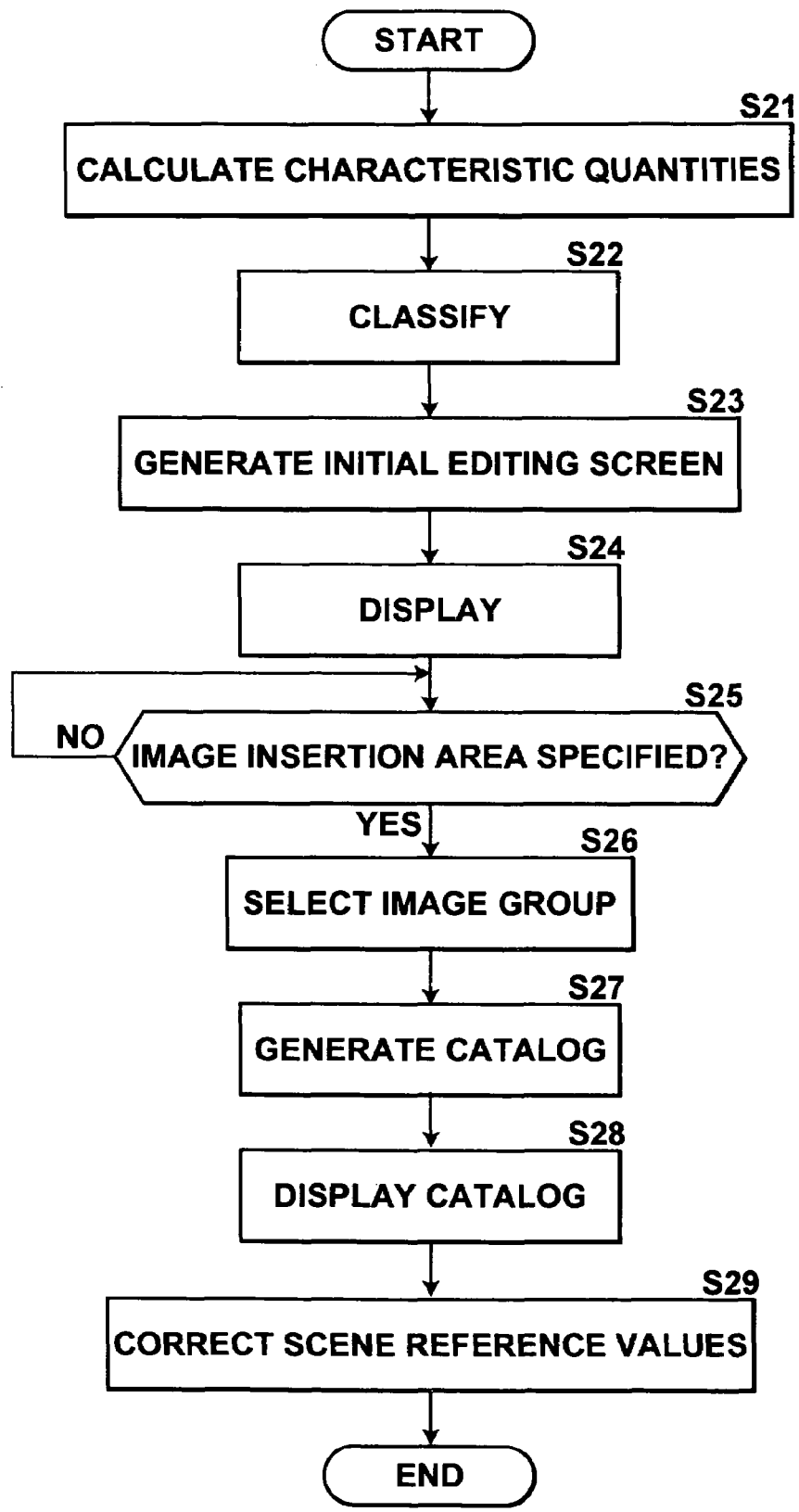
FIG. 11 is a flow chart showing a procedure carried out at the time of display of an editing screen in a second embodiment of the present invention.

A procedure carried out in the second embodiment will be explained next. In the second embodiment, the procedure is different from the procedure in the first embodiment only in how the editing screen is displayed. Therefore, only the procedure for displaying the editing screen will be explained below. FIG. 11 is a flow chart showing the procedure for displaying the editing screen in the second embodiment. The template T1 has been specified as the event template and this specification has been input to the photo album editing PC 1.

The photo album editing PC 1 calculates the characteristic quantities of the image data sets (Step S21), and generates the image groups by classifying the image data sets into the scenes according to the characteristic quantities (Step S22). The photo album editing PC 1 generates the initial editing screen in which the catalog display field 31 is blank and the template T1 is displayed in the template display field 33 as the event template (Step S23). The photo album editing PC 1 displays the initial editing screen (Step S24).

Monitoring is started on whether any one of the image insertion areas in the template T1 has been specified or not (Step S25). If a result at Step S25 is affirmative, the photo album editing PC 1 calculates the distances in the three-dimensional space (r,g,b) between the averages of the characteristic quantities of the scenes for the image groups A, B, and C and the scene reference values of the specified image insertion area in the template reference-value table TT1 in the storage means 23, and selects the image group having the shortest distance (Step S26). The photo album editing PC 1 generates the catalog of the images represented by the image data sets in the selected image group (Step S27), and displays the catalog in the catalog display field 31 in the editing screen 30 (Step S28). The photo album editing PC 1 corrects the scene reference values of the specified image insertion area in the template reference-value table TT1 by using the averages of the characteristic quantities of the scene in the image group classified into the scene corresponding to the specified image insertion area (Step S29) to end the procedure. Step S29 may be carried out after Step S26 or later, or in parallel to Step S26 or later.

When another one of the image insertion areas is specified, the photo album editing PC 1 calculates the distances in the three-dimensional space (r,g,b) between the averages of the characteristic quantities of the scenes for the image groups A, B, and C and the scene reference values, with reference to the scene reference values of the specified image insertion area in the template reference-value table TT1 in the same manner as has been described above, and finds the image group having the shortest distance for generating the catalog of the image data sets in the image group to be displayed on the display means.

As has been described above, according to the second embodiment, the image data sets obtained by photography are classified into the image groups of the respective scenes included in the event according to the characteristic quantities of the scenes. When any one of the image insertion areas is specified in the template in the editing screen 30, the corresponding image group is selected with reference to the scene reference values of the specified image insertion area in the template reference-value table TT1, and the catalog of the images represented by the image data sets in the selected image group is generated. The catalog is then displayed in the editing screen 30. Therefore, if the operator only specifies one of the image insertion areas in the template, the catalog of the images corresponding to the scene to be inserted in the selected image insertion area can be displayed. In this manner, the operator carrying out an editing operation can easily select the image for the scene by referring to the catalog. Consequently, a burden on the operator can be reduced at the time of selection of the images to be inserted in the image insertion areas.

By correcting the scene reference values in the template reference-value table TT1 based on the averages of the characteristic quantities of the scenes represented by the images in the image groups classified into the scenes, the scene reference values can become closer to the characteristic quantities of the scenes represented by the images used for actual editing. Therefore, the images to be inserted in the image insertion areas can be selected more appropriately according to the reference values of the characteristic quantities of the scenes.

In the first and second embodiments, the averages of R, G, and B colors in the images represented by the image data sets are used as the characteristic quantities, which are not necessarily limited thereto. Various kinds of information representing at least one of lightness, saturation, hue, image composition, and a subject type in the scenes represented by the images can be used as the characteristic quantities. More specifically, at least one of a color characteristic of each of the images (such as color balance in the entire image, an average lightness, an average saturation, a color variance representing variance in colors of pixels, a lightness histogram, a saturation histogram, and a hue histogram), a composition characteristic thereof (such as space frequency distribution), and a subject characteristic thereof (such as a proportion of the areas of a face, the sky, the water area such as the ocean, tree area such as plants and greens, soil and streets or roads, buildings, or the like in the entire image, the size of a face, the number of faces, a subject shape, portrait/landscape mode of the image, whether the photograph was taken indoor or outdoor, or the like) can be used as the characteristic quantities.

Classification to obtain whether the photograph was taken indoor or outdoor, the number of faces, the proportion of the area of the face, the proportion of the area of the sky, the proportion of the area of the water region, the proportion of the area of the tree region, the proportion of the area of soil, streets or roads (hereinafter called, road or the like), the proportion of the area of the buildings, and portrait/landscape mode of the image as characteristic quantities C1-C9 will be described as a third embodiment.

Here, for obtaining whether the photograph was taken indoor or outdoor, the value of the lightness (lightness at a focus point) provided as supplementary information of the image data is compared with a predetermined threshold value. If the value is equal to or higher than the threshold value, it is judged that the photograph was taken outdoor. If the value is less than the threshold value, it is judged that the photograph was taken indoor. Then, if the judgment result is outdoor, 1 is obtained as the characteristic quantity C1. If the judgment result is indoor, 0 is obtained as the characteristic quantity C1.

For obtaining the number of the faces, the number of regions, of which color is flesh, and which are ellipses, in the image is counted, for example. The counted number is obtained as the characteristic quantity C2.

For obtaining the proportion of the area of the face, the number of pixels included in the regions, of which color is flesh, and which are ellipses, in the image is counted. The counted number is divided by the total number of the pixels in the image to obtain the characteristic quantity C3.

Regarding the proportion of the area of the sky, the proportion of the area of the water region, the proportion of the area of the tree region, the proportion of the area of the road or the like, and the proportion of the area of the buildings, the characteristic quantities C4-C8 are obtained by using the technique disclosed in Japanese Unexamined Patent Publication No. 2004-78939, for example, which is not limited thereto. The technique disclosed in Japanese Unexamined Patent Publication No. 2004-78939 will be described.

First, the image is divided into regions (object regions) for each object based on the color, lightness, or the like. At the same time, the entire image is divided into a plurality of small block regions, which are smaller than the object regions for each object. Meanwhile, a self-organization map for distinguishing the object type, which has been obtained by learning various elements such as color, lightness, and image structure, is prepared for the sky, water, trees, roads or like buildings or the like. The object type is distinguished for each of the block regions with reference to the self-organization map. Then, the number of the objects in each type is counted for each of the object regions. The object type, of which number is the largest, is output as the type of the object region.

In the present embodiment, the image is divided into the object regions as described above. After the type (sky, water, tree, road or the like, building) of each of the object regions is specified, the area of the object region (the number of the pixels in the object region) is divided by the area of the entire image (the total number of pixels in the image). Accordingly, the proportion of the area of the sky, the proportion of the area of the water region, the proportion of the area of the tree region, the proportion of the area of the road or the like, and the proportion of the area of the buildings are obtained as the characteristic quantities C4-C8.

The portrait/landscape mode of the image is judged based on information on the portrait/landscape (vertical or horizontal) mode provided as the supplementary information of the image data and the description of the pixel number of the image (if 1280×960, landscape mode, and if 960×1280, portrait mode). If it is the landscape mode, 1 is obtained as the characteristic quantity C9. If it is the portrait mode, 0 is obtained as the characteristic quantity C9.

Figure 12:
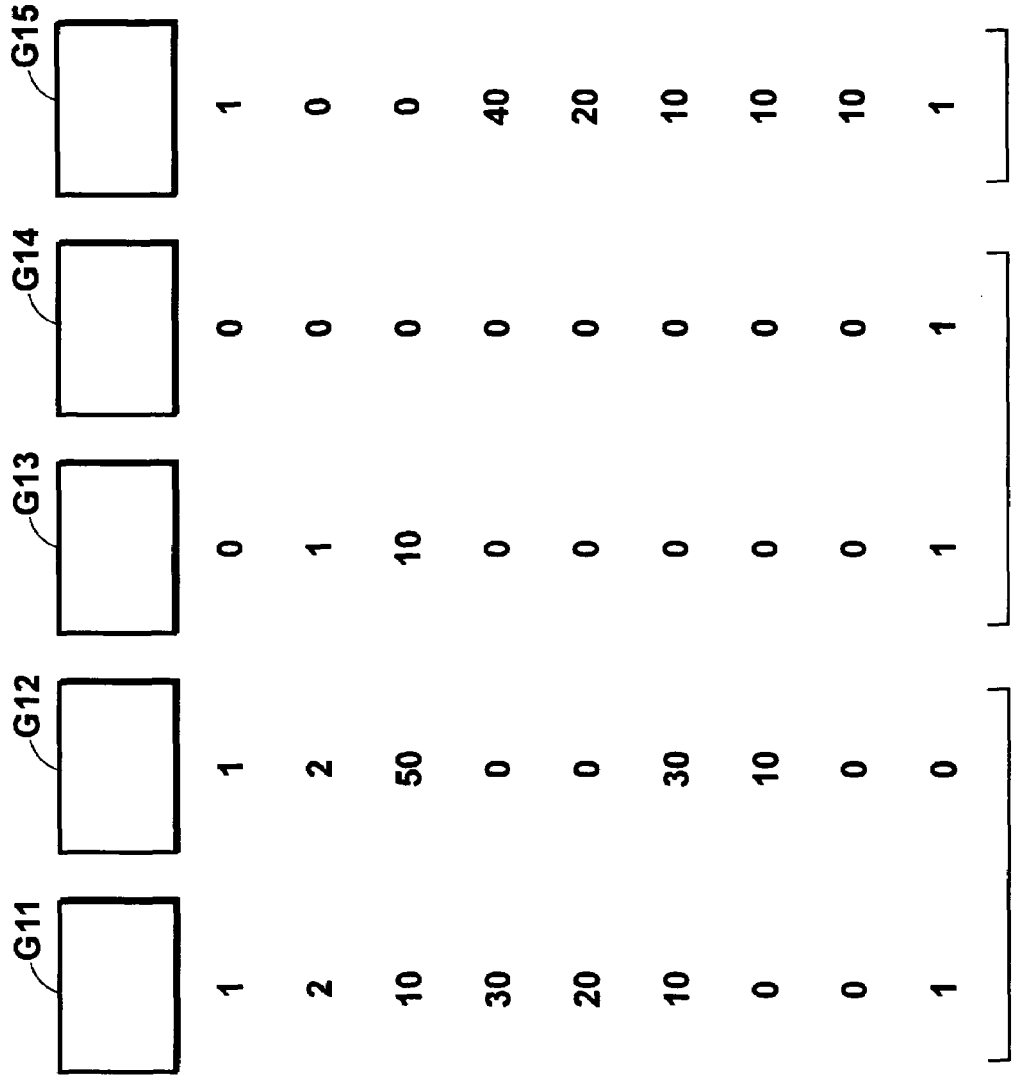
FIG. 12 is a diagram illustrating a calculation result of characteristic quantities in a third embodiment.

Here, an example of the calculation results of the characteristic quantities C1-C9 for five sets of image data G11-G15 are illustrated in FIG. 12. Then, the distance of the characteristic quantities C1-C9 between the images in the 9-dimensional space of the characteristic quantities C1-C9 is obtained. When the distance between two sets of image data is equal to or less than a predetermined threshold value Th2, it is judged that the characteristic quantities are approximate, namely the scenes of the images are similar, and the two sets of image data are classified into the same image group. In the example illustrated in FIG. 12, the image data G11 and G12 are classified into the same group A'. The image data G13 and G14 are classified into the same group B'. The image data G15 is classified into a single group C'.

FIG. 13 is a diagram illustrating an example of a target value sequence table in the third embodiment. As illustrated in FIG. 13, in the target value sequence table OT2, event names representing the events such as a wedding 1 and a wedding 2 and the target values of the characteristic quantities C1-C9 of the scenes included in the event represented by each of the event names, are described according to the appearance order of the scenes. For example, in the event of the wedding 1, three scenes of the scene 1', scene 2', and scene 3' sequentially appear in this order. The target values of the characteristic quantities of each of the scenes 1', 2', and 3' are (1, 2, 50, 0, 0, 25, 0, 0, 0), (0, 1, 15, 0, 0, 0, 0, 0, 1), and (1, 0, 0, 35, 15, 5, 5, 5, 1), respectively. The target values of the characteristic quantities C1-C9 of the scenes are obtained by calculating the characteristic quantities C1-C9 of the image obtained by taking a photograph of a target scene.

Figure 14:
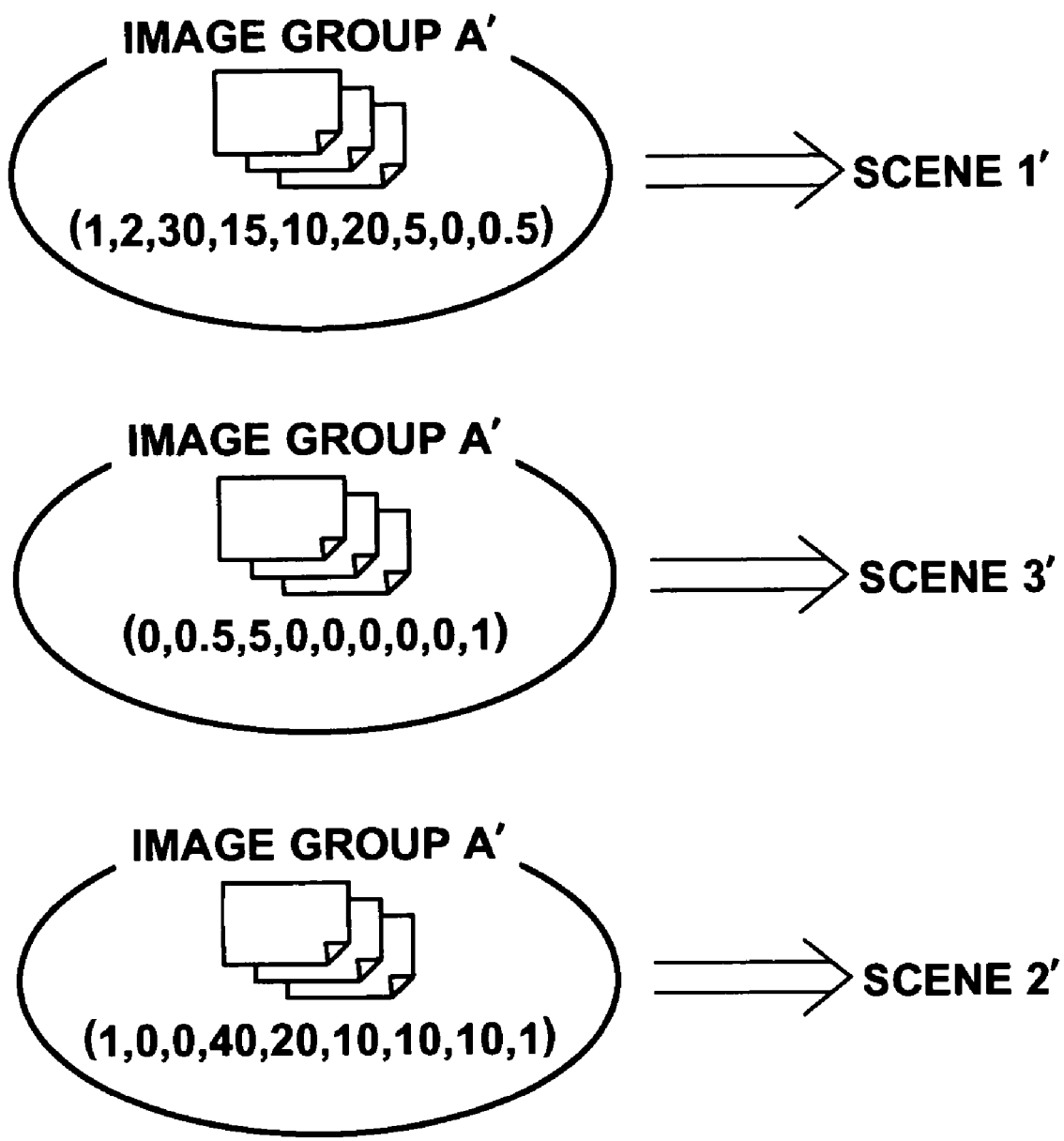
FIG. 14 is a diagram for explaining correspondence between image groups and scenes.

The album editing PC 1 refers to the target value sequence table OT2, and arranges the classified image groups according to a predetermined order. FIG. 14 is a diagram for explaining the correspondence between the image groups and the scenes. Here, in the third embodiment, it is assumed that the image data was classified into three image groups of image groups A', B', and C', and the wedding 1 was specified as the event.

First, the album editing PC 1 calculates the average values of the characteristic quantities C1-C9 of the scenes in all of the image data included in the image groups A', B', and C'. As illustrated in FIG. 14, it is assumed that the average value of the image group A' is (1, 2, 30, 15, 10, 20, 5, 0, 0, 5). The average value of the image group B' is (0, 0, 5, 5, 0, 0, 0, 0, 0, 1). The average value of the image group C' is (1, 0, 0, 40, 20, 10, 10, 10, 1). The album editing PC 1 calculates the distance between the average value of the characteristic quantities of the scenes in each of the image groups A', B', and C' and the scene characteristic quantity target value of each scene at the wedding 1 in the target value sequence table OT2 in the 9-dimensional space. Each of the image groups is correlated with a scene when the distance becomes the minimum. Accordingly, the image group A' is correlated with the scene 1'. The image group B' is correlated with the scene 3'. The image group C' is correlated with the scene 2'.

After the image groups A', C', and B' are correlated with the scenes 1', 2', and 3', the album editing PC 1 changes the target value of each of the scenes 1', 2', and 3' included in the target value sequence table OT2 by using the average of the characteristic quantities of the scene for the image groups A', B', and C'.

Further, in the embodiment 2 as described above, the scene target value of each of the image insertion areas included in the template target value table TT1 is changed by using the average value of the characteristic quantities of the scene for the image group, classified into a scene corresponding to the image insertion area. However, the characteristic quantity of the image, which has been selected to be inserted in the image insertion area, itself may be used to change the scene target value in the template target value table. Hereinafter, this is called a fourth embodiment.

Figure 15:
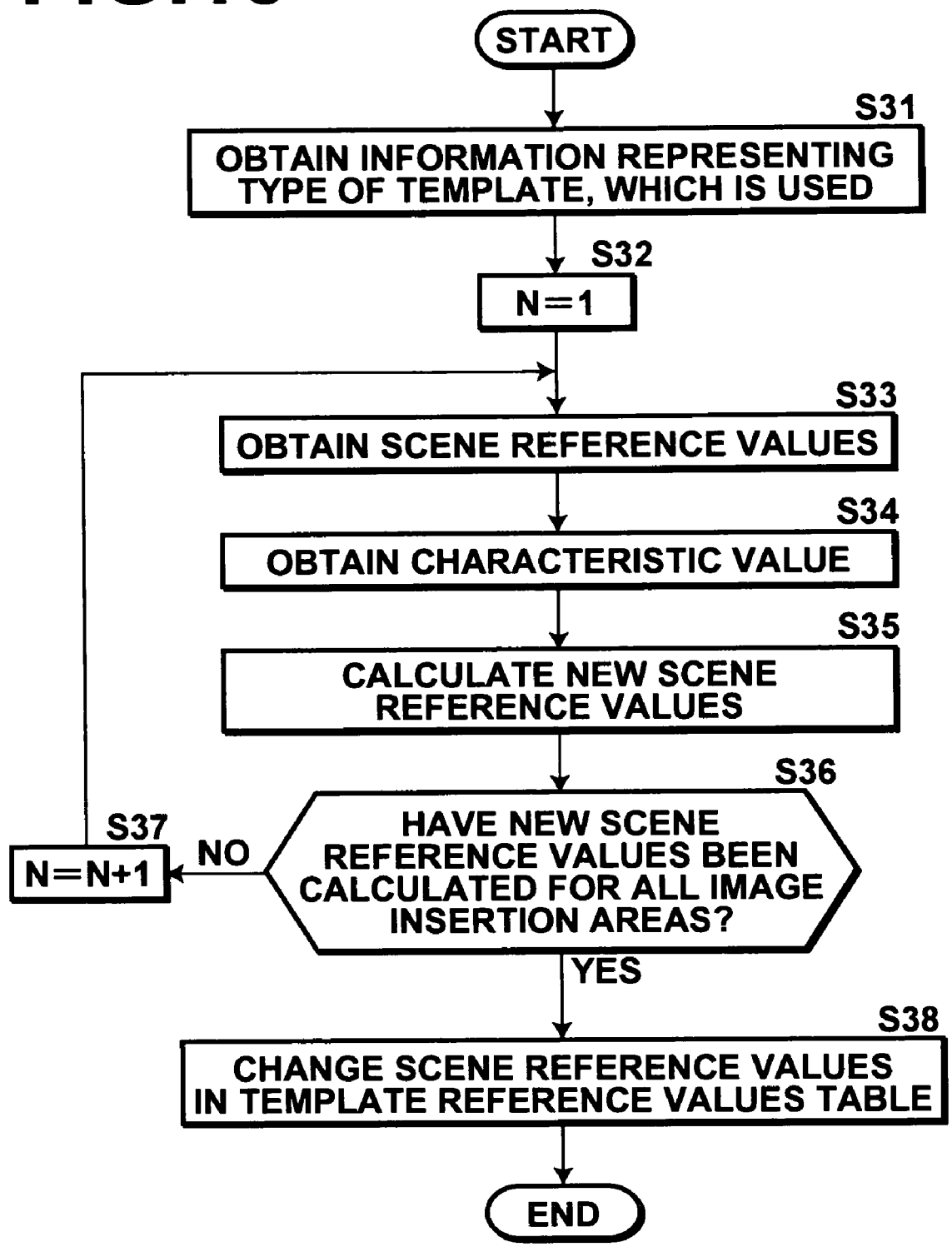
FIG. 15 is a flow chart illustrating target value change processing.

In the fourth embodiment, processing in step S29 in the flow chart illustrated in FIG. 11 is not performed. When the DETERMINE button is clicked, and the step S5 in the flow chart illustrated in FIG. 8 becomes positive, processing for changing the target value is performed. FIG. 15 is a flow chart illustrating target value change processing. Here, it is assumed that the average value of each of the R, G, and B included in the image, represented by the image data, in the first or second embodiment is used as the characteristic quantity.

If step S5 in the flowchart illustrated in FIG. 8 is positive, the album editing PC 1 starts target value change processing, and obtains information representing the type of the template used for album edit (step S31). Then, the album editing PC 1 sets N=1 (N is the order of the image insertion area) so that processing is performed on the first image insertion area of the template (step S32). Then, the album editing PC 1 obtains the scene target value corresponding to the N-th image insertion area with reference to the template target value table TT1 illustrated in FIG. 10 (step S33). For example, if a template T2 is used as the template, and the image insertion area is the first image insertion area 1-$a$, the album editing PC 1 obtains (60, 60, 10) as the scene target value.

Further, the album editing PC 1 obtains the characteristic quantity of the image, selected to be inserted in the N-th image insertion area (step S34). Then, the album editing PC 1 obtains a new scene target value by performing weighting addition of the obtained scene target value and the characteristic quantity (step S35). Specifically, the new scene target value (r, g, b) is obtained by performing the operation according to the following expression (1):

$$\text{New Scene Target Value}(r,g,b) = \alpha(50,50,20) + (1-\alpha)(60,60,10) \quad (0 < \alpha < 1) \quad (1)$$

Next, the album editing PC 1 judges whether the new scene target value has been calculated for all of the image insertion areas (step S36). If step S36 is NO, the album editing PC 1 sets N=N+1 so that processing is performed on the next image insertion area (step S37), and processing goes back to step S33. If step S36 is YES, the album editing PC 1 changes the scene target value of the template target value table TT1 by using the new scene target value (step S38), and processing ends.

Here, if $\alpha$ is 1 the expression (1), the characteristic property of the image, which has been selected to be inserted, is the new target value.

Here, the characteristic quantities C1, C2, and C9 used in the third embodiment must be integers. Therefore, if the new scene target value is a decimal, the decimal must be rounded to an integer.

The characteristic quantity of the image, selected to be inserted in the image insertion area, may be correlated with the template, and stored in the storage means 23 as the target value history information, instead of changing the template target value table TT1 by using the new scene target value. FIG. 16 illustrates an example of the target value history information. FIG. 16 is a diagram illustrating target value history information OR1 for the template T2. As illustrated in FIG. 16, the target value history information OR1 is correlated with the data, when the template T2 was used for editing, and the characteristic quantity of the image, selected to be inserted in the image insertion area, is described in the template target value table.

When the operator edits an album, the album editing PC 1 displays the target value history information OR 1 together with the editing screen 30 so that the operator can select a desired template target value table. Then, the album editing PC 1 refers to the scene target value of the template target value table, selected by the operator, and calculates the distance between the scene target value and the average value of the characteristic quantities of the scenes for all of the image groups A, B, and C in the 3-dimensional or 9-dimensional space. Then, the album editing PC 1 obtains an image group when the obtained distance is the minimum. The album editing PC 1 produces a catalog of image data classified into the obtained image group, and displays the catalog.

Further, in each of the embodiments described above, the processed image data sets of the selected images are printed by the mini-laboratory 3A or 3B, and the operator pastes the prints on the photo album paper corresponding to the template for generating the photo album. However, the file server 5 may generate a composite image data set representing an image (a photo album image) having the images selected by the operator and inserted in the image insertion areas in the template by combining the processed image data sets and the template data set. The composite image data set is output to the mini-laboratory 3A or 3B.

If the mini-laboratory 3A or 3B prints the composite image data set generated in this manner, the photo album can be generated by simply binding the print of the photo album image, without pasting the prints on the paper.

In each of the above-described embodiments, the photo album is generated by using the image data sets obtained by reading the images recorded on the developed film. However, a photo album can be generated by using image data sets obtained by a digital camera. In this case, the file server 5 comprises a media drive for reading the image data sets from a recording medium such as a memory card storing the image data sets obtained by photography. The image data sets read from the recording medium by the media drive are stored in the file server 5.

In each of the above-described embodiments, the file server 5 carries out the preparatory processing only on the image data sets selected by the operator of the photo album editing PC 1. However, all the image data sets may be stored in the file server 5 after the preparatory processing carried out thereon at the time of reception of the image data sets from the mini-laboratory 3A or 3B or from the scanner 3C. Furthermore, the photo album editing PC 1 may carry out the preparatory processing on all the image data sets sent from the file server 5 or on the image data sets selected for generation of the photo album.

In each of the embodiments as described above, the photo album editing PC 1 or the file server 5 may generate, based on layout information, data (album data) including a user image inserted in a template, and the data may be sent to a server or like, which can be accessed by the user, and stored. Accordingly, the user can check whether the photo album will be successfully produced before actual production of the photo album. Further, in this case, the user may select whether the photo album is produced by using the album data or the photo album is reedited.

What is claimed is:

1. An image editing apparatus comprising:
display means for displaying various kinds of information;
reference-value sequence storage means for storing reference value sequences wherein reference values of a characteristic quantity or characteristic quantities representing a characteristic or characteristics of scenes arranged in predetermined order in each of events are arranged in the predetermined order;
input means for receiving input of information on a predetermined one of the events, images on the predetermined event, and a template as photo album paper having at least one image insertion area in which an image or images are inserted;
characteristic quantity calculation means for calculating the characteristic quantity or quantities of scenes represented by the respective images;
image group generation means for generating image groups by classifying the images into the scenes in the predetermined event with reference to the characteristic quantity or quantities of the scenes calculated for the respective images;
image display control means for arranging the image groups in the order of the scenes in the predetermined event with reference to the reference value sequence corresponding to the predetermined event, for generating a catalog of the images in the order of the arranged image groups, and for displaying the catalog on the display means;
template display control means for displaying the template on the display means together with the catalog; and
image selection means for receiving selection of the image or images to be inserted in the image insertion area or areas from the catalog;
wherein the reference value sequence is a sequence of reference values of the characteristic quantity or characteristic quantities that correspond to subjects and scenes, which are calculated from pixel values, and are correlated with events; and
wherein a plurality of images are arranged and displayed according to the reference value sequence.

2. The image editing apparatus according to claim 1 further comprising reference-value sequence correction means for correcting the reference values of the characteristic quantity or quantities in the respective scenes in the reference value sequence for the predetermined event, according to the characteristic quantity or quantities of the respective scenes in the images classified into the scenes in the predetermined event.

3. The image editing apparatus according to claim 1, wherein the characteristic quantity or quantities are at least one of lightness, saturation, hue, image composition, and a subject type of the scenes represented by the images.

4. The image editing apparatus according to claim 1, wherein the characteristic quantity is information representing at least one of the color characteristic of the image, an image structure characteristic, and a subject characteristic.

5. The image editing apparatus according to claim 4, wherein the subject characteristic is a characteristic including at least one of a proportion of the area of a face, a proportion of the area of a water region, a proportion of the area of a tree region, a proportion of the area of soil and streets or roads, and a proportion of the area of buildings in the entire image, the size of a face, the number of faces, a subject shape, landscape/portrait (horizontal/vertical) mode of the image, and whether a photography place is indoor or outdoor.

6. The image editing apparatus according to claim 1, wherein the events are weddings.

7. The image editing apparatus according to claim 1, further comprising guide image display means for displaying in the image insertion area or areas in the template displayed on the display means a guide image or guide images for guiding the image or images to be inserted therein.

8. The image editing apparatus according to claim 1 further comprising editing means for editing the image or images inserted in the image insertion area or areas.

9. The image editing apparatus according to claim 8, wherein the editing means carries out at least one of processing for changing a quality of the image or images, processing for reshaping the image or images, and processing for restoring the image or images on the image or images.

10. An image editing apparatus comprising:
display means for displaying various kinds of information;
template reference-value storage means for storing scene reference values as reference values of a characteristic quantity or characteristic quantities representing a characteristic or characteristics of scenes to be inserted in respective image insertion areas in each of templates used as photo album paper having the image insertion areas in which images are inserted;

input means for receiving input of images on a predetermined event having scenes arranged in predetermined order, one of the templates including the image insertion areas in which the images corresponding to the scenes in the predetermined event are respectively inserted, and information on the template;

characteristic quantity calculation means for calculating the characteristic quantity or quantities of the scenes represented by the respective images;

image group generation means for generating image groups by classifying the images into the scenes in the predetermined event, with reference to the characteristic quantity or quantities of the scenes calculated for the respective images;

template display control means for displaying the template on the display means;

specification reception means for receiving specification of any one of the image insertion areas in the template displayed on the display means;

image display control means for selecting the image group classified into the scene of the specified image insertion area with reference to the scene reference value or values of the specified image insertion area in the template, for generating a catalog of the images classified into the image group, and for displaying the catalog on the display means; and image selection means for receiving selection of the image to be inserted in the specified image insertion area from the catalog wherein the characteristic quantity or characteristic quantities representing a characteristic or characteristics of scenes are calculated from pixel values and are correlated with events.

11. The image editing apparatus according to claim 10 further comprising scene reference-value correction means for correcting the scene reference values for the respective image insertion areas in the template, according to the characteristic quantity or quantities of the respective scenes of the images classified into the scenes in the predetermined event.

12. The image editing apparatus according to claim 10, wherein the characteristic quantity or quantities are at least one of lightness, saturation, hue, image composition, and a subject type of the scenes represented by the images.

13. The image editing apparatus according to claim 10, wherein the event is a wedding.

14. The image editing apparatus according to claim 10, further comprising guide image display means for displaying in the image insertion areas in the template displayed on the display means guide images for guiding the images to be inserted therein.

15. The image editing apparatus according to claim 10 further comprising editing means for editing the image inserted in the image insertion area.

16. The image editing apparatus according to claim 13, wherein the editing means carries out at least one of processing for changing a quality of the image, processing for reshaping the image, and processing for restoring the image on the image.

17. An image editing method comprising the steps of:
receiving input of information representing a predetermined one of events, images on the predetermined event, and a template to be used as photo album paper having at least one image insertion area in which an image or images are inserted;

calculating, by a processor, a characteristic quantity or characteristic quantities of scenes represented by the respective images;

generating image groups by classifying the images into the scenes in the predetermined event with reference to the characteristic quantity or quantities of the scenes calculated for the respective images;

arranging the image groups in order of the scenes in the predetermined event with reference to one of reference value sequences corresponding to the predetermined event, generating a catalog of the images in the order of the arranged image groups, and displaying the catalog on a display means, the reference value sequences describing reference values of the characteristic quantity or quantities representing scenes arranged in predetermined order in each of the events in the predetermined order, the reference value sequences being stored in reference-value sequence storage means;

displaying the template on the display means together with the catalog; and receiving selection of the image or images to be inserted in the image insertion area or areas from the catalog;

wherein the characteristic quantity or characteristic quantities correspond to subjects and scenes, which are calculated from pixel values, and are correlated with events.

18. An image editing method comprising the steps of:
receiving input of images on a predetermined event having scenes arranged in predetermined order, one of templates including image insertion areas in which images corresponding to the scenes in the predetermined event are inserted, and information on the template;

calculating, by a processor, a characteristic quantity or characteristic quantities in the scenes represented by the respective images;

generating image groups by classifying the images into the scenes in the predetermined event, with reference to the characteristic quantity or quantities of the scenes calculated for the respective images;

displaying the template on display means;

receiving specification of any one of the image insertion areas in the template displayed on the display means;

selecting the image group classified into the scene of the specified image insertion area with reference to a scene reference value or scene reference values corresponding to the specified image insertion area in the template, generating a catalog of the images in the selected image group, and displaying the catalog on the display means, the scene reference values describing reference values of the characteristic quantity or quantities representing a characteristic or characteristics of scenes to be inserted in respective image insertion areas in each of the templates as photo album paper having the image insertion areas in which images are inserted, the scene reference values being stored in template reference-value storage means; and receiving selection of the image to be inserted in the specified image insertion area from the catalog;

wherein the characteristic quantity or characteristic quantities correspond to subjects and scenes, which are calculated from pixel values, and are correlated with events.

19. A non-transitory computer-readable medium storing a program for causing a computer to execute an image editing method comprising the steps of:

receiving input of information representing a predetermined one of events, images on the predetermined event, and a template to be used as photo album paper having at least one image insertion area in which an image or images are inserted;

calculating a characteristic quantity or characteristic quantities of scenes represented by the respective images;

generating image groups by classifying the images into the scenes in the predetermined event with reference to the characteristic quantity or quantities of the scenes calculated for the respective images;

arranging the image groups in order of the scenes in the predetermined event with reference to one of reference value sequences corresponding to the predetermined event, generating a catalog of the images in the order of the arranged image groups, and displaying the catalog on the display means, the reference value sequences describing reference values of the characteristic quantity or quantities representing scenes arranged in predetermined order in each of the events in the predetermined order, the reference value sequences being stored in reference-value sequence storage means;

displaying the template on the display means together with the catalog; and receiving selection of the image or images to be inserted in the image insertion area or areas from the catalog;

wherein the characteristic quantity or characteristic quantities correspond to subjects and scenes, which are calculated from pixel values, and are correlated with events.

20. A non-transitory computer-readable medium storing a program for causing a computer to execute an image editing method comprising the steps of:

receiving input of images on a predetermined event having scenes arranged in predetermined order, one of templates including image insertion areas in which images corresponding to the scenes in the predetermined event are inserted, and information on the template;

calculating a characteristic quantity or characteristic quantities in the scenes represented by the respective images;

generating image groups by classifying the images into the scenes in the predetermined event, with reference to the characteristic quantity or quantities of the scenes calculated for the respective images;

displaying the template on display means;

receiving specification of any one of the image insertion areas in the template displayed on the display means;

selecting the image group classified into the scene of the specified image insertion area with reference to a scene reference value or scene reference values corresponding to the specified image insertion area in the template, generating a catalog of the images in the selected image group, and displaying the catalog on the display means, the scene reference values describing reference values of the characteristic quantity or quantities representing a characteristic or characteristics of scenes to be inserted in respective image insertion areas in each of the templates as photo album paper having the image insertion areas in which images are inserted, the scene reference values being stored in template reference-value storage means; and receiving selection of the image to be inserted in the specified image insertion area from the catalog;

wherein the characteristic quantity or characteristic quantities correspond to subjects and scenes, which are calculated from pixel values, and are correlated with events.

21. The image editing apparatus according to claim 10, wherein the characteristic quantity or quantities are at least one of lightness, saturation and hue.

* * * * *